United States Patent [19]

Benzi

[11] Patent Number: 4,747,804
[45] Date of Patent: May 31, 1988

[54] PROTECTOR FOR UNIVERSAL JOINTS

[75] Inventor: Rolando Benzi, Cassano d'Adda, Italy

[73] Assignee: Benzi & Di Terlizzi s.n.c., Cassano d'Adda, Italy

[21] Appl. No.: 883,134

[22] Filed: Jul. 8, 1986

Related U.S. Application Data

[63] Continuation of Ser. No. 705,555, Feb. 26, 1985, abandoned.

[30] Foreign Application Priority Data

Mar. 1, 1984 [IT] Italy ................... 19873 A/84

[51] Int. Cl.$^4$ .............................................. F16P 1/00
[52] U.S. Cl. ..................................... 464/170; 403/23; 464/172
[58] Field of Search ............... 74/18; 403/23, 50, 51; 464/170, 171, 172, 173, 175

[56] References Cited

U.S. PATENT DOCUMENTS

| | | | |
|---|---|---|---|
| 3,194,615 | 7/1965 | Weasler | 464/172 X |
| 3,884,536 | 5/1975 | Buthe | 464/170 X |
| 4,435,166 | 3/1984 | Bondioli | 464/172 |
| 4,443,207 | 4/1984 | Buthe et al. | 464/175 X |
| 4,568,313 | 2/1986 | Diffenderfer et al. | 464/172 |

FOREIGN PATENT DOCUMENTS 2121137 12/1983 United Kingdom ................ 464/172

Primary Examiner—Daniel P. Stodola
Attorney, Agent, or Firm—Peter K. Kontler

[57] ABSTRACT

A protector for use around the universal joint in the power take-off of a motor vehicle has a rigid tubular section which is made of a synthetic plastic material and surrounds one of the shafts in the joint, a rigid frustoconical section which is made of a synthetic plastic material and spacedly surrounds the fork that is rigid with the one shaft and the smaller-diameter end portion of which is bonded to the respective end of the rigid tubular section, and a deformable tubular section which is made of a synthetic plastic material and spacedly surrounds the other fork of the joint and is permanently connected to the larger-diameter end portion of the frustoconical section. The protector further employs a split ring which is made of a synthetic plastic material and has an internal tongue receivable in the external circumferential groove of the fork as well as a set of deformable plastic lugs, or metallic lugs secured thereto by screws or rivets, which are anchored in the frustoconical section. The split ring is installed in the smaller-diameter end portion of the frustoconical section. The larger-diameter end portion of the frustoconical section has a radially outwardly extending flange with one or more annuli of holes for reception of the material of the deformable tubular section.

8 Claims, 1 Drawing Sheet

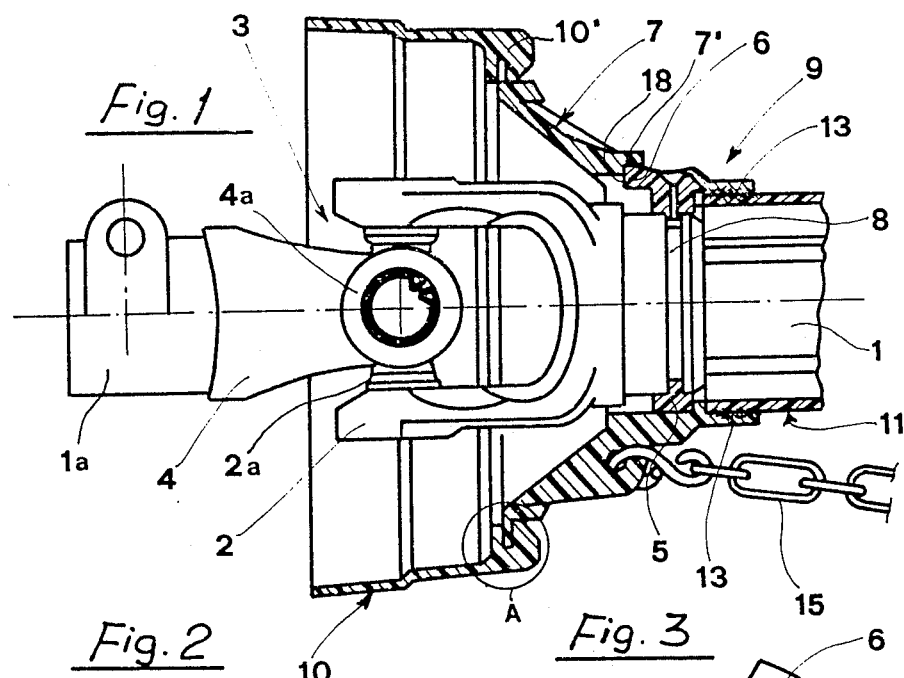
Fig. 1
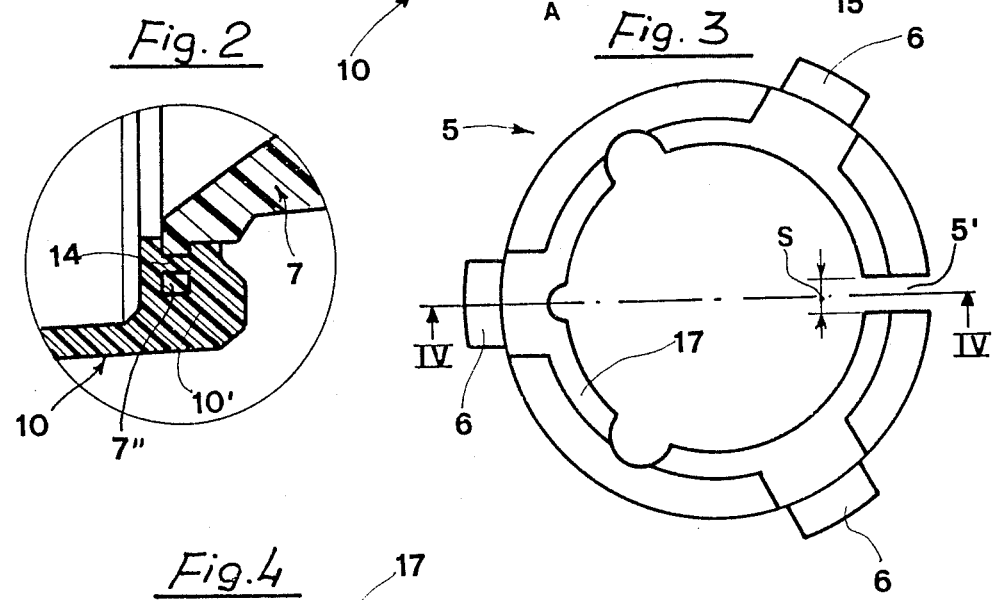
Fig. 2
Fig. 3
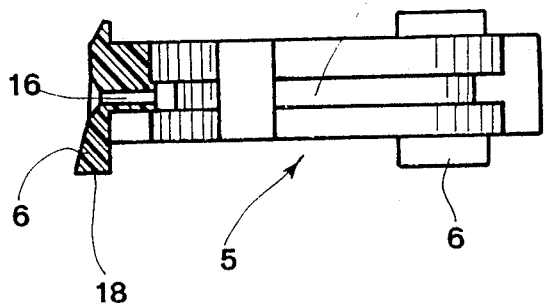
Fig. 4
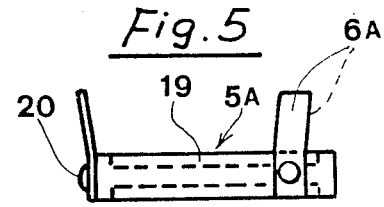
Fig. 5

PROTECTOR FOR UNIVERSAL JOINTS

This application is a continuation of application Ser. No. 705,555 filed Feb. 26, 1985, now abandoned.

BACKGROUND OF THE INVENTION

The present invention relates to improvements in protectors or guards which can be placed around universal joints, such as the customary Hook's coupling (also known as Cardan joint) in the power take-off of a motor vehicle. The invention also relates to a method of making such protectors.

It is often necessary to utilize the power take-off of a tractor or another heavy-duty vehicle to transmit motion to separable implements, e.g., to rotary hoes, rotary ditchers and/or other agricultural or earth moving implements which are not equipped with discrete prime movers. In many instances, the power take-off is provided with one or more universal joints in order to allow for necessary articulation between the towing or pushing vehicle and the implement which receives motion by way of the power take-off.

The moving parts of the power take-off must be shielded to reduce the likelihood of injury to an operator and/or the likelihood of contamination of moving parts. Such shielding is necessary not only based on normal prudence but is also frequently prescribed by authorities which regulate the manufacture and utilization of such equipment. It is desirable to provide a protector or guard which completely surrounds the moving parts of the power take-off, e.g., a take-off including the engine-driven shaft, a first universal joint which is driven by such shaft, a second shaft which is driven by the first joint, a second universal joint which is driven by the second shaft, and a third shaft which is driven by the second universal joint and transmits torque to the parts of the implement receiving motion from the power take-off.

Heretofore known protectors for the universal joint or joints of a power take-off normally comprise two components which are made of synthetic plastic material and are similar or identical to each other. In many instances, the two components differ only in certain dimensions. One of these components surrounds the first universal joint and a portion of the second shaft, and the other component surrounds the remaining portion of the second shaft and the second universal joint. Each of the two components comprises a tube which surrounds a shaft, a frustoconical section which surrounds one fork of the respective universal joint, and a deformable second tube which spacedly surrounds the remainder of the respective universal joint. Each component further comprises a bearing ring which serves to mount the assembly of the two tubes and frustoconical section on a fork of the universal joint. To this end, a portion of the bearing ring extends into a groove which is machined into the one fork of the corresponding universal joint. Various types of protectors differ from each other in the manner in which the tubes are connected to the frustoconical section and in which the bearing ring is connected to the assembly including the two tubes and the frustoconical section. The mechanical characteristics of each part of the protector should be selected with a view to satisfy the safety regulations in a particular country or in a particular administrative unit of the country. For example, the connections between the tubes and the frustoconical section must stand certain axial stresses which tend to move the respective constituents away from each other. The same applies for the connection between the bearing ring and the corresponding fork of the universal joint. The frustoconical section must withstand (without bending or breaking) certain radially oriented deforming stresses which tend to move its material inwardly toward the adjacent universal joint. On the other hand, the larger-diameter tube must be capable of undergoing at least some deformation in response to contact with the adjacent part or parts of the power take-off, e.g., in response to mutual inclination of two shafts which are coupled to each other by the forks of a universal joint.

In accordance with an earlier proposal of the applicant, the smaller-diameter tube is connected to the corresponding end portion of the frustoconical section by metallic fastening clips which are caused to pass through the material of the tube and through, a collar at the smaller-diameter end of the frustoconical section. The bearing ring of such earlier protector has radially extending tabs received in complementary apertures provided therefor in the tapering part of the frustoconical section. The latter is held against disengagement from the tabs by a further ring which is forcibly applied around the tabs.

A protector which is manufactured by the firm Jean Walterscheid GmbH of Lohmar/Rhineland, German Federal Republic, has a smaller-diameter tube one end of which is formed with an annulus of apertures for radially outwardly extending pins at the smaller-diameter end of the frustoconical section. The tips of the pins form a circle whose diameter matches or approximates the outer diameter of the smaller-diameter tube. Thus, the apertured end of the smaller-diameter tube must be expanded, thereupon forced over the pins and finally pressed inwardly so that the pins penetrate into the apertures and couple the smaller-diameter tube to the smaller-diameter end portion of the frustoconical section. A portion of the bearing ring in the protector which is manufactured by Jean Walterscheid GmbH extends into the circumferential groove of one fork of the respective universal joint and the bearing ring has radial tabs which are received in complementary grooves of the frustoconical section. The frustoconical section and the larger-diameter tube are made of one piece, the same as in accordance with applicant's afore-discussed earlier proposal, so that the rigidity of the frustoconical section matches that of the larger-diameter tube. This is not an ideal solution because the larger-diameter tube is relatively stiff and the rigidity of the frustoconical section is less than satisfactory.

The firm Bondioli & Pavesi of Suzzara, Italy, manufactures a different protector wherein the bearing ring serves to couple the smaller-diameter tube to the respective end portion of the frustoconical section. To this end, the bearing ring surrounds the adjacent end of the smaller-diameter tube and has arms which extend substantially axially of the tubes and carry radially inwardly extending teeth which are received in apertures provided therefor in the respective end portion of the smaller-diameter tube. The arms are outwardly adjacent to the respective end face of the smaller-diameter tube. The bearing ring is further provided with elastic extensions which are inclined with reference to its axis and are received in similarly inclined recesses of the frustoconical section. One end of the larger-diameter tube is forced into the larger-diameter end portion of the frustoconical section.

It is also known to make the frustoconical section and the larger-diameter tube of a single piece of deformable material and to enhance the rigidity of the frustoconical section by a second frustoconical section which is made of a stiff material and is force fit into the deformable frustoconical section.

All of the aforediscussed protectors exhibit a number of serious drawbacks. Thus, the metallic clips which are used in applicant's earlier protector are likely to rust and to thus weaken the connection between the frustoconical section and the smaller-diameter tube. Moreover, the aforementioned further ring contributes to the initial and assembly cost of applicant's earlier protector. Still further, the mechanical properties of the frustoconical section and of the larger-diameter tube are unsatisfactory because the rigidity of the frustoconical section is insufficient and the rigidity of the larger-diameter tube is excessive. This also applies for the protector which is manufactured by Jean Walterscheid GmbH and which exhibits the additional drawback that the connection between the frustoconical section and the smaller-diameter tube is complex and expensive. Still further, the assembly of this protector is a complex procedure because the smaller-diameter tube must be forcibly introduced into the smaller-diameter end portion of the frustoconical section. The protector of Bondioli & Pavesi comprises an excessive number of discrete parts and the cost of reinforcing the frustoconical section is very high.

OBJECTS AND SUMMARY OF THE INVENTION

An object of the invention is to provide a novel and improved protector which is simpler and less expensive than but at least as satisfactory as heretofore known protectors.

Another object of the invention is to provide a protector wherein each component and each section of each component can be made of a material which is best suited to ensure the establishment of a reliable shroud around the corresponding portion of a universal joint or the like.

A further object of the invention is to provide a novel and improved protector which can be used in conjunction with existing power take-off devices in motor vehicles or the like as a superior substitute for heretofore known protectors.

An additional object of the invention is to provide a novel and improved method of making the above outlined protector and a novel and improved method of assembling the constituents of the protector.

Still another object of the invention is to provide a method which renders it possible to select the parts of the protector from a variety of materials which are best suited for the making of the respective parts and which enable the respective parts to optimally perform their assigned functions in the finished protector.

An additional object of the invention is to provide a method which can be practiced by resorting to available machinery and to readily available materials.

A further object of the invention is to provide a simple, compact, lightweight and durable protector which can be used to surround and shield conventional universal joints and which can be assembled or taken apart with little loss in time and without the exertion of a substantial effort.

One feature of the invention resides in the provision of a protector or guard for application around a universal joint, such as a Hook's coupling in the power take-off of a motor vehicle. The improved protector comprises a one-piece first component including a first substantially tubular section having a first end and a second end, a substantially frustoconical section having a smaller-diameter end portion integral with one end of the first tubular section and a larger-diameter end portion, and a second substantially tubular section having two ends one of which is integral with the larger-diameter end portion of the frustoconical section. The protector further comprises an annular second component having internally disposed first coupling means for rotatably securing the second component to a part of the joint which is to be confined and second coupling means for non-rotatably securing the second component to the first component. The first tubular section and the frustoconical section preferably consist of an at least substantially rigid synthetic plastic material, and the second tubular section preferably consists of a deformable (e.g., elastomeric) synthetic plastic material. The second component can constitute a split ring having a ring-shaped element made of a synthetic plastic material and a plurality of deformable male detent members receivable in suitable sockets of the furstoconical section. The male detent members can constitute lugs which are integral with the ring-shaped element or which are made of a metallic material and are secured to the ring-shaped element by screws, rivets, bolts or other suitable fasteners. The frustoconical section can be bonded (e.g., thermally welded) to at least one of the tubular sections. The protector can be applied around an universal joint of the type having a rotary part (e.g., a fork) with an external circumferential groove, and the first coupling means of the second component then preferably includes one or more tongues which are receivable in the external groove of such rotary part.

Another feature of the invention resides in the provision of a method of making a protector for application around a portion of or an entire universal joint, such as a Hook's coupling in the power take-off of a motor vehicle. The method comprises the steps of separately producing a smaller-diameter tubular section (e.g., by severing it from a rigid pipe which is made of a synthetic plastic material), a larger-diameter tubular section (e.g., by extruding or injection molding it from a suitable synthetic plastic material) and a frustoconical section with a smaller-diameter end portion and a larger-diameter end portion, permanently connecting the smaller-diameter end portion of the frustoconical section to one end of the smaller-diameter tubular section (e.g., by welding or by resorting to another bonding technique), permanently securing the larger-diameter end portion of the frustoconical section to one end of the larger-diameter tubular section (e.g., during injection molding or extrusion of the larger-diameter tubular section), and installing in one of the sections (preferably in the smaller-diameter end portion of the frustoconical section) an annular component which is rotatable on a part of the joint. If desired, the frustoconical section can be formed by injection molding, extrusion or another plastic shaping technique and at least one of the end portions of such frustoconical section can be bonded to the respective tubular section in the course of such extruding or injection molding step. One end portion of the frustoconical section can be provided with a plurality of cavities (e.g., in the form of blind holes or through holes). The establishment of a permanent connection between such one end portion and the corresponding tubular section can include converting a plasticized synthetic plastic material into the corresponding tubular section and causing some material of such tubular section to penetrate into the cavities so that the frustoconical section and the corresponding tubular section are permanently connected or secured to each other by the plastic material in the cavities as soon as the plastic material is allowed or caused to set. Such permanent connection can be established between the frustoconical section and the smaller-diameter and/or larger-diameter tubular section.

The installing step can include making a ring-shaped element from a suitable synthetic plastic material, providing the ring-shaped element with a plurality of preferably deformable male detent members in the form of lugs or the like, inserting the ring-shaped element into the frustoconical section (preferably into the smaller-diameter end portion of the frustoconical section) and anchoring the male detent members in the frustoconical section or in the smaller-diameter tubular section. The male detent members can constitute metallic lugs (e.g., lugs made of sheet steel) which are secured to the ring-shaped element by rivets, screws, bolts or analogous fasteners and can be received in complementary sockets or pockets of the frustoconical section or in the smaller-diameter tubular section.

The novel features which are considered as characteristic of the invention are set forth in particular in the appended claims. The improved protector itself, however, both as to its construction and the mode of making and installing the same, together with additional features and advantages thereof, will be best understood upon perusal of the following detailed description of certain specific embodiments with reference to the accompanying drawing.

BRIEF DESCRIPTION OF THE DRAWING

FIG. 1 is a fragmentary elevational view of a universal joint in a power take-off and a fragmentary axial sectional view of a protector which embodies one form of the invention and wherein the entire second component is made of a synthetic plastic material;

FIG. 2 is an enlarged view of a detail within the circle A of FIG. 1;

FIG. 3 is an enlarged plan view of the second component in the protector of FIG. 1;

FIG. 4 is a sectional view of the second component as seen in the direction of arrows from the line IV—IV of FIG. 3; and FIG. 5 is a schematic elevational view of a modified second component.

DESCRIPTION OF THE PREFERRED EMBODIMENTS

Referring first to FIG. 1, there is shown a portion of a power take-off which is shielded by a protector 9 embodying one form of the present invention. The power take-off comprises a first shaft 1 which can receive torque from the engine of a tractor or another motor vehicle, a universal joint 3 of the type known as Hook's coupling or Cardan joint with two forks 2, 4 and two pins 2a, 4a in the form of a cross, and a further shaft 1a which is rigid with the fork 4 and can carry one fork of a second universal joint serving to transmit motion to an argicultural implement or the like, not shown. It is clear that the shaft 1 can constitute a means for transmitting torque to an implement and the shaft 1a can be located nearer to the engine.

The improved protector 9 comprises a first component including a smaller-diameter tubular section 11 which can be obtained by severing it from an elongated synthetic plastic tube or pipe exhibiting the required resistance to wear, resistance to corrosion, resistance to denting and/or other desirable characteristics; a frustoconical section 7 whose smaller-diameter end portion constitutes a sleeve that is slipped onto the adjacent end of the tubular section 11 and is bonded thereto (e.g., by welding as shown schematically at 13); and a larger-diameter tubular section 10 one end of which is permanently connected to the larger-diameter end portion of the frustoconical section. The second component 5 of the improved protector 9 has internal coupling means in the form of a circumferentially complete or interrupted tongue 17 extending into a circumferentially complete external groove 8 in the adjacent portion of the fork 2 (close to the shaft 1). The illustrated second component 5 is a split ring (the radial slot is shown at 5' in FIG. 3) which is further provided with a second coupling means including three equidistant radially outwardly extending male detent members 6 which are deformable and include portions 18 receivable in complementary sockets or pockets 7' of the frustoconical section 7 close to the junction between the smaller-diameter end portion of the section 7 and the respective end of the smaller-diameter tubular section 11. The second component 5 can be made of a single piece of nylon or another suitable synthetic plastic material.

The tubular section 11 surrounds the shaft 1, the frustoconical section 7 spacedly surrounds a portion of the fork 2, and the tubular section 10 spacedly surrounds the remaining portion of the fork 2, a portion of the fork 4 and the pins 2a, 4a at least when the axis of the shaft 1 coincides with the axis of the shaft 1a or when the axes of these shafts make a relatively small acute angle.

In accordance with a feature of the invention, the sections 10, 7 and 11 constitute a one-piece member which is preferably made of synthetic plastic material. The section 10 is deformable (e.g., it can be made from a flexible elastomeric synthetic plastic material; the section 7 is preferably rigid to prevent radial deformation inwardly toward the fork 2; and the section 11 is also rigid but its rigidity need not match that of the section 7 (it can be higher or lower). One mode of permanently connecting the sections 7 and 10 to each other is shown in greater detail in FIG. 2. The larger-diameter end portion of the frustoconical section 7 has or constitutes a radially outwardly extending flange 7" with an annulus of cavities 14 in the form of through holes which are filled with the material of the section 10. The latter can be produced in accordance with a conventional injection molding, extruding or other technique and its right-hand end, as viewed in FIGS. 1 or 2, has a bead 10' which surrounds the flange 7" from three sides and whose material fills the cavities 14 to thus ensure the establishment of a permanent connection which can stand pronounced stresses tending to move the sections 10 and 7 axially and away from each other. A similar connection can be provided between the frustoconical section 7 and the smaller-diameter tubular section 11 in lieu of the bond 13. The reference character 15 denotes a chain which is connected to an eyelet of the frustoconical section 7 and to the motor vehicle (not shown) to ensure that the first component including the sections 10, 7 and 11 cannot rotate with the shaft 1. The bond 13 can be established by ultrasonic welding or any other suitable procedure which ensures the establishment of a permanent connection between the sections 7 and 11 and guarantees that such connection can stand the required tensional, flexing and/or other stresses. It is also possible to butt-weld the sections 7 and 11 to each other and to provide the cavities in one end of the section 10 so that they can receive some material of the larger-diameter end portion of the frustoconical section 7. If the section 7 is prefabricated and the section 10 is made by extrusion or injection molding thereafter, the permanent connection between the sections 7 and 10 will or can be established in a manner as shown in FIG. 2. If the section 7 is made subsequent to making of the section 11, the sections 7 and 11 can be permanently connected to each other in a manner as shown in FIG. 2.

FIG. 4 shows that the component 5 can be formed with a radially extending hole 16 which allows lubricant to penetrate into the groove 8 of the fork 2. The component 5 can be formed with two or more holes 16. The width s of the radial slot 5' in the component 5 is sufficient to allow for convenient mounting of the component 5 on the fork 2 so that the tongue 17 extends into the groove 8 and the power take-off can rotate relative to the sections 10, 7, 11 and component 5 of the protector 9.

FIG. 4 further shows a detent member which extends axially beyond the upper end face of the component 5 to be received in a complementary pocket of the frustoconical section 7 (see FIG. 1).

The tubular section 11 can be obtained by subdividing a continuous or a relatively long tube or pipe into sections of desired length. The frustoconical section 7 can be mass-produced in a suitable injection molding or other plastic processing machine, and the bond 13 or another suitable permanent connection between the sections 7 and 11 can be established in the course of the injection molding, extruding or a like operation which results in the making of the section 7. The section 10 can be made in the aforedescribed manner, i.e., by injection molding or extruding and simultaneous establishment of a permanent connection with the adjacent larger-diameter end portion of the frustoconical section 7 (it being assumed that the section 7 has been mass-produced prior to making of the section 10). The sections 7 and 10 can be permanently connected to each other prior to or after the establishment of a permanent connection between the sections 7 and 11.

FIG. 5 shows a modified second component 5A which includes a ring-shaped element 19 of synthetic plastic material and several (e.g., three equidistant) metallic male detent members 6A which are secured to the element 19 by screws, bolts, rivets or analogous fasteners 20. The male detent members 6A can be made of sheet steel or another springy metallic material which can be deformed for the purpose of establishing a reliable connection between the second component 5A and the frustoconical section of the first component. The element 19 can be identical with the component 5 minus the lugs 6.

An important advantage of the improved method and of the improved protector 9 is that the sections 10, 7 and 11 of the first component of the protector are permanently connected to each other. This eliminates the possibility of misplacing or losing one or more sections and simplifies the assembly of the improved protector around a universal joint or the like. Moreover, the cost of the improved protector is surprisingly low in spite of the fact that each of the sections 10, 7 and 11 can exhibit different mechanical and/or other properties; this is due to the fact that the sections can be produced separately and thereupon permanently connected to each other and/or that one (prefabricated) section can be permanently connected to another section during the making of the other section. Still further, the configuration of the sections of the first component and of the second component is simple, i.e., without numerous protuberances, recesses and like features which contribute to the cost of the mold, as well as without undercuts and any other cost-increasing treatment. As can be seen in the drawing, the section 11 can constitute a piece of a mass-produced rigid pipe which is subdivided into sections of required length for permanent attachment to the smaller-diameter end portions of frustoconical sections. The making of the flange 7" and of the cavities 14 therein does not involve a substantial cost and the placing of a prefabricated frustoconical section 7 into the mold for the making of the tubular section 10 is also a known and relatively simple as well as inexpensive procedure.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. A protector for use around a universal joint, such as the joint in the power take-off of a motor vehicle, comprising a one-piece first component including a rigid first substantially tubular section having a first end and a second end, a substantially frustoconical section less rigid than said first section and having a smaller-diameter end portion integral with one end of said tubular section and larger-diameter end portion, and a flexible second substantially tubular section less rigid than said frustoconical section and having two ends one of which is integral with said larger-diameter end portion; and an annular second component having internal first coupling means for rotatably securing the second component to a part of the joint and second coupling means for securing the second component to said first component.

2. The protector of claim 1, wherein said second component is a split ring.

3. The protector of claim 1, wherein at least one of said components contains synthetic plastic material.

4. The protector of claim 1, wherein said second coupling means comprises a plurality of deformable male detent members and said frustoconical section has sockets for said detent members.

5. The protector of claim 4, wherein said detent members are discrete lugs consisting of a metallic material and said second component further comprises a ring-shaped element and fastener means securing said lugs to said ring-shaped element.

6. The protector of claim 1, wherein said frustoconical section is permenently bonded to at least one of said tubular sections.

7. The protector of claim 1 for use around a universal joint including a rotary part having an external circumferential groove, wherein said first coupling means comprises a tongue which is receivable in the groove of such rotary part.

8. The protector of claim 1, further comprising additional coupling means between said first and second components including a detent member on said second component and a complementary pocket provided for said detent member in the frustoconical section of said first component.

* * * * *